Figure 1:
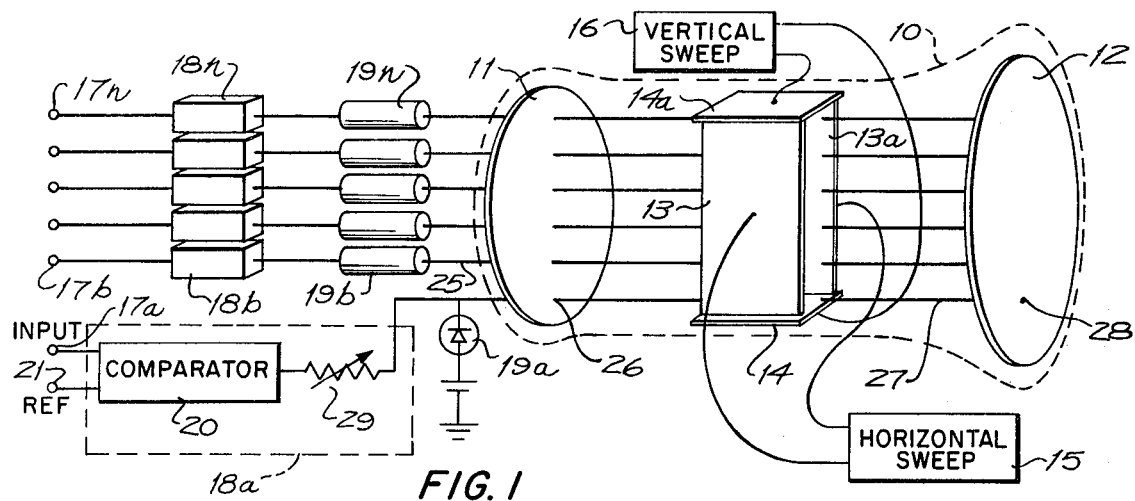

United States Patent [19]

Halasz et al.

[11] 3,836,795

[45] Sept. 17, 1974

[54] PARALLEL MULTIPLE CHANNEL DISPLAY SYSTEM

[75] Inventors: Stephen J. Halasz, Claremont; Charles D. Winston, Glendora, both of Calif.

[73] Assignee: Aerojet-General Corporation, El Monte, Calif.

[22] Filed: Apr. 2, 1973

[21] Appl. No.: 347,278

Related U.S. Application Data

[63] Continuation of Ser. No. 85,908, Nov. 2, 1970, abandoned.

[52] U.S. Cl. ......... 315/13 C, 315/13 R, 315/13 ST, 315/30
[51] Int. Cl. ............................................ H01j 29/50
[58] Field of Search ........... 315/13 R, 13 C, 13 CG, 315/13 ST, 23–25, 30, 31 R

[56] References Cited
UNITED STATES PATENTS

| | | | |
|---|---|---|---|
| 3,053,931 | 9/1962 | Ruditas | 315/13 C |
| 3,213,423 | 10/1965 | Congleton | 315/23 X |
| 3,379,340 | 8/1968 | Neal et al. | 315/13 C |
| 3,457,451 | 7/1969 | Manley | 315/11 X |
| 3,459,989 | 8/1969 | McCabe | 315/13 C |
| 3,465,199 | 9/1969 | Simshauser | 315/23 X |
| 3,500,113 | 3/1970 | Allen | 315/13 C |
| 3,577,031 | 5/1971 | Welsh et al. | 315/13 C |
| 3,600,509 | 8/1971 | Gibson | 315/13 ST |
| 3,683,358 | 8/1972 | Eichelberger | 340/324 A |

Primary Examiner—Stephen J. Lechert, Jr.
Assistant Examiner—P. A. Nelson
Attorney, Agent, or Firm—Edward O. Ansell

[57] ABSTRACT

Visual signal information from multiple electronic signal channels are displayed simultaneously on the screen of a cathode ray tube by impressing each signal channel on the input of an individual electronic comparator which also has applied to it a reference waveform. The signal of the channel interacting with the reference wave-form results in an output from the comparator in the form of pulses of varying width depending on the amplitude of the signal at each pulse of the wave-form. These output pulses are applied to a light emitting diode whose output light pulses in response to the pulses impressed on the diode are focused on a photoemitter cathode of the cathode ray tube. Beam deflecting means within the tube produce lines visible on the screen so that pulse information from all the channels are observed visually and simultaneously.

7 Claims, 2 Drawing Figures

INVENTORS
STEPHEN J. HALASZ
CHARLES D. WINSTON
BY
D. Gordon Angus
ATTORNEY

PARALLEL MULTIPLE CHANNEL DISPLAY SYSTEM

This is a continuation of application Ser. No. 85,908 filed Nov. 2, 1970 now abandoned.

This invention relates to multi-channel signal systems and has for an object to display simultaneously signals from multiple channels. A related object is to read visually information from multiple sources simultaneously.

It has heretofore been a practice to display information from multiple signal channels sequentially in time by switching from one channel to another and displaying information derived from only one channel at a time.

In accordance with the present invention information from all the channels is simultaneously displayed visually. The invention is carried out by connecting each distinct electrical signal source to a pulse width modulated driver circuit where it is transformed to a signal pulse having a time duration proportional to the amplitude of the original signal from the channel. The pulse drives a light emitter diode which produces a light pulse having a time duration equal to that of the electrical signal pulse. The light pulse is incident upon a light sensitive photocathode surface of a cathode ray tube which creates an electron beam pulse of equal time duration. The electron beam impinges upon a screen of the type having the ability to produce a light pulse on the display. The electron beam is deflected to produce a line of video display information on the screen. The beam deflection can be accomplished in a well known manner, for example electrostatically or electromagnetically, by a beam deflection wave-form generator to produce the scanning of the beam suitably synchronized.

Each signal channel creates its own election beam in this manner and writes an individual line on the screen. Since all the cathode ray beams are acted upon by the same scanning wave-form all of the beams are deflected simultaneously producing their parallel display lines furnishing information from the respective channels.

The cathode ray tube is preferably of the image intensifier type and the intensification of light by such a tube aids in setting the brightness of the display.

According to an optional feature, deflection of the electron beams at an angle to the above-mentioned deflection may be provided in a well known manner by a second deflection voltage, which will result in an interlacing of the lines traced by the beams.

The use of pulse width modulating of the light emitting diodes serves to eliminate non-linearities of the brightness vs. current of the diodes, by operating at a constant current level.

Figure 2:
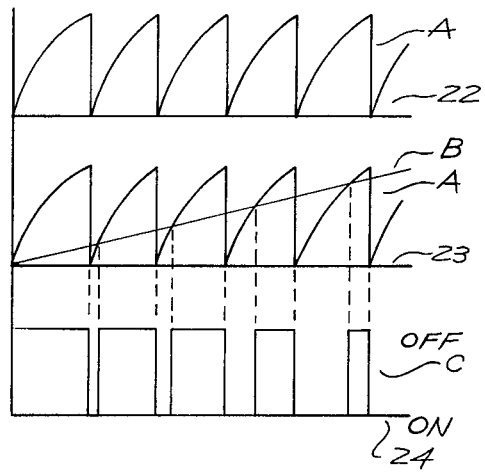

The foregoing and other features of the invention will be better understood from the following detailed description and the accompanying drawing of which:

FIG. 1 illustrates schematically a multi-channel display system according to this invention; and FIG. 2 illustrates graphically the formation of pulse signals during operation of the system of FIG. 1.

In FIG. 1 there is shown in dotted line form the envelope of a cathode ray tube 10 of an image intensifier type, having within one end of the envelope a lightsensitive photocathode 11 in the shape of a disk and a phosphor screen 12 at the other end of the tube. At an intermediate position between the cathode and the screen there is provided a pair of parallel spaced vertical plates 13 and 13a for producing horizontal sweep of the electron beam in a well known manner, and also a pair of parallel spaced horizontal plates 14 and 14a for producing vertical sweep of the electron beam in a well known manner. A source of horizontal sweep voltage 15 is connected across the horizontal sweep plates and a source of vertical sweep voltage 16 is connected across the vertical sweep plates.

Separate individual channels of signals which are to be displayed on the screen of the tube are connected respectively to separate input terminals designated at $17_a$, $17_b$ ... $17_n$. It will be understood that practically any number of input terminals and therefore signal channels can be used, limited only by the number of scanning lines of the tube. In this schematic representation it is assumed that all of the signal circuits are connected to a common ground, which is not shown, and that only the ungrounded sides of the signal channels and inputs are shown.

The individual input terminals lead to the inputs of respective pulse width modulated driver circuits designated $18_a$, $18_b$ ... $18_n$, the outputs of which are connected to respective light emitting diodes $19_a$, $19_b$ ... $19_n$, which function in a well known manner to give off light when energized by a signal. The diodes are placed in proximity to the light sensitive photocathode 11 and arranged so that each emits a narrow beam or pencil of light parallel with each other and directed toward the cathode so that points of light from the respective diodes are focused on the cathode in a vertical array. Hence the light from successive ones of the light emitting diodes impinges upon a successively higher part of the photocathode. The end of the cathode ray tube envelope where the photocathode is located is transparent to permit the light from the photo diodes to pass through.

One of the pulse width modulated driver circuits indicated as $18_a$ is shown and described in some detail, it being understood that the other driver circuits are similar. The lower circuit comprises a comparator 20 into which there is fed the input signal of its signal channel at input terminal $17_a$ and also a reference wave source at terminal 21.

The intensification of light by the image intensifier tube 10 is an additional aid in setting the brightness of the display. It has been found that this system and method permits the achievement of as many as about 14 gray levels of contrast in the display, although this many levels of contrast is not necessary for operation of the system as a display system for multi-channel viewing.

The reference wave form is illustrated in FIG. 2, wherein the abscissas represent time and the ordinates represent voltage, as the repetitive wave A in the form of a series of identical pulses of a generally sawtooth or exponential wave shape shape the leading edges of which slope upward to their maximum where they are abruptly cut off as represented by the vertical line terminations of the successive periods. Nothing but the reference wave form is shown on abscissa 22. On abscissa 23 there is shown the same reference wave form A on the same time scale and also the signal input B for input terminal $17_a$, which is assumed to be of substantially lower frequency than that of the reference wave form so that it is represented as a rising line representing part of a single period or cycle. According to well known operation of such a comparator the signal input acts as a chopper to eliminate from the comparator outlet all those parts of reference wave form A below the level of the signal B.

The arrangement of the comparator is such that any amount of reference voltage above the signal input voltage at any time results in a definite output voltage at the comparator. This comparator output is represented by the pulses C on abscissa 24 which has the same time scale as the other abscissas in FIG. 2. Accordingly, the comparator output is in the form of a series of square wave pulses C all of equal height but of varying width depending on the level of the signal input. Thus, the pulse widths C are proportional to the signal amplitude. The organization of such a comparator circuit is well known and needs no further discussion here. A typical comparator circuit which may be used is that shown in pages 163 and 164 of the publication entitled "Fairchild Semi-Conductor Linear Integrated Circuits Applications Handbook," by James N. Giles, Library of Congress Catalog No. 67-27446.

The pulses C are applied through a variable resistor 29 to the light-emitting diode $19_a$, which is a well known form of diode, for example a Gallium arsenide phosphide light emitting solid state diode, one side of which has the comparator output connected to it and the other side of which is ordinarily connected to ground usually through a biasing voltage. The result is that the diode becomes conductive only during the time of a pulse C and for the duration of of each pulse, the amplitude of the current flow being the same during all pulses.

The well known function of the light emitting diode is to emit light of an intensity dependent on current flow through it and for the time duration of each pulse. Hence, there is obtained a series of pulses of light all of the same intensity but of different durations corresponding to the durations of the individual pulses C. The thin pencil of light 25 from diode $19_a$ impinges on a point 26 of the photocathode 11, which in turn produces an electron beam 27 which is made visible as a point 28 on the phosphor screen 12 for periods of time corresponding to the widths of the pulses C. The intensity of the pulse current flowing through the photoemitter can be adjusted by means of the variable resistance potentiometer 29.

The horizontal sweep generator 15 causes the point 28 to trace a horizontal line on the phosphor screen and the brightness of the line will be modulated proportional to the width of the several pulses C. The line appears as a continuous line of varying brightness because the frequency of the pulses A is shown to be high enough to provide second pulses within the period of one time of the moving luminous spot.

If a vertical sweep voltage is used in the cathode ray tube, which is optional, there will be produced an interlacing of the horizontal lines on the phosphor screen, thereby modifying the visual display to this extent, which may be found desirable for some applications.

Typical relationships can be, for example, as follows: Frequency of reference wave form, 100 Kilo Hz; horizontal beam deflection frequency 40 Hz; vertical beam deflection frequency (if used) 4 Hz. It will be recognized that great variation of frequency relationships can be accommodated. Furthermore, the vertical beam deflection frequency (if used) could be made about the same as the horizontal beam deflected frequency, for example, 20 Hz for each.

The parallel display system according to this invention which enables all detector signals in a multi-detector system to be processed and displayed in parallel and simultaneously has a variety of applications, particularly in view of the fact that a great many signal channels, for example hundreds or even thousands of channels can be used. Its ability to make use of infrared detecting devices and to produce resulting displays of high resolution capability, adapts it for infrared imaging systems. It is thus useful for aerial reconnaissance and aircraft control. Furthermore, it can be adapted to conventional TV-type display.

What is claimed is:

1. A system for simultaneous comparative visual display of information received from a plurality of sources comprising: an electron beam display tube having a photoemissive cathode and a screen on which there appears a visible spot when an electron beam from the cathode impinges on it; a plurality of input signal paths, each having a comparator with an input for connection to an individual signal channel and an input for connection to a reference wave source, the output signal of each comparator being in the form of pulses, the width of each pulse being dependent on the amplitude at the comparator input of the signal from the corresponding signal channel; a plurality of constant intensity radiant energy emitting means each one of which is connected to a corresponding comparator output, each one of said means being arranged to direct radiant energy to a separate and distinct portion of said photoemissive cathode when the respective radiant energy emitting means is energized by output pulses from the respective comparator, thereby producing emission of an electron beam from each such portion of said photoemissive cathode; and means for accelerating and deflecting said plurality of electron beams in unison to produce simultaneously parallel lines on the screen containing information representative of the information from the respective signal channels.

2. A system according to claim 1 in which the means for deflecting the electron beams comprises an electron beam deflecting device and a sweep voltage source attached to said device for repeatedly deflecting each beam along its same path.

3. A system according to claim 1 in which each reference wave source produces a regularly recurring wave.

4. A system according to claim 1 in which the radiant energy from each radiant energy emitting means is in the form of light pulses having a time duration dependent on the amplitude of the signal in the corresponding input signal path.

5. A system according to claim 1 in which the electron beams from the separate and distinct portions of the photoemissive cathode impinge different points on the screen such that the parallel lines produced by the electron beam deflecting means are correspondingly spaced from each other on the screen.

6. A system according to claim 1 in which there is a second means for deflecting the electron beams, the deflection due to said second deflecting means being angularly displaced in direction from said parallel lines, and said second deflecting means being operable to deflect at times between the formation of said parallel lines by the first mentioned deflecting means, whereby there is produced an interlacing of said parallel lines.

7. The method of producing a simultaneous comparative visual display of information represented by signals from a plurality of signal channels, which comprises: simultaneously comparing the information signal in each individual channel with a corresponding repetitive reference wave form to produce output pulses having a time width dependent on the amplitude of the information signal; generating from said time width modulated pulses in each channel, corresponding constant-intensity light pulses having the same time duration as said comparator output pulses, said light pulses being generated from among a plurality of sources, each one of which is associated solely with a respective signal channel; directing said light pulses from each particular light source to a mutually exclusive portion of a photoemissive device to produce a plurality of electron beams, each corresponding to a particular light receptive portion; and accelerating and deflecting, in unison, said plurality of electron beams to present simultaneously, but separately, on a photophosphorescent output device, information concerning each of said plurality of signal channels.

* * * * *

UNITED STATES PATENT OFFICE
CERTIFICATE OF CORRECTION

PATENT NO. : 3,836,795
DATED : September 17, 1974
INVENTOR(S) : Stephen J. Halasz and Charles D. Winston It is certified that error appears in the above-identified patent and that said Letters Patent are hereby corrected as shown below:

Column 2, line 57, "shape shape" should be --shape--.

Column 3, line 31, "of of" should be --of--.

Signed and Sealed this twenty-fifth Day of November 1975

[SEAL]

Attest:

RUTH C. MASON
Attesting Officer

C. MARSHALL DANN
Commissioner of Patents and Trademarks